United States Patent
Nakatsukasa et al.

(10) Patent No.: US 12,081,426 B2
(45) Date of Patent: Sep. 3, 2024

(54) INFORMATION PROCESSING DEVICE, INFORMATION PROCESSING METHOD AND INFORMATION PROCESSING PROGRAM

(71) Applicant: Nippon Telegraph and Telephone Corporation, Tokyo (JP)

(72) Inventors: Satoshi Nakatsukasa, Musashino (JP); Takayuki Fujiwara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/275,871

(22) PCT Filed: Feb. 16, 2021

(86) PCT No.: PCT/JP2021/005761
§ 371 (c)(1),
(2) Date: Aug. 4, 2023

(87) PCT Pub. No.: WO2022/176029
PCT Pub. Date: Aug. 25, 2022

(65) Prior Publication Data
US 2024/0129217 A1   Apr. 18, 2024

(51) Int. Cl.
*H04L 43/16* (2022.01)
*H04L 43/0852* (2022.01)
*H04L 47/28* (2022.01)

(52) U.S. Cl.
CPC .......... *H04L 43/16* (2013.01); *H04L 43/0852* (2013.01); *H04L 47/28* (2013.01)

(58) Field of Classification Search
CPC ......... H04L 43/16; H04L 47/27; H04L 47/28; H04L 67/55; H04L 43/02; H04L 43/0876; H04L 43/0888; H04L 43/0894
See application file for complete search history.

(56) References Cited

U.S. PATENT DOCUMENTS 9,871,673 B2 * 1/2018 Muetzel .................. H04L 12/46
10,103,964 B2 * 10/2018 Sheleheda ............. H04L 41/069
(Continued)

OTHER PUBLICATIONS

BusinessNetwork.jp [online], "How to use Telemetry (Beginner's Guide)," Jul. 2018, retrieved on Dec. 21, 2020, retrieved from URL<https://businessnetwork.jp/Detail/tabid/65/artid/6206/Default.aspx>, 19 pages (with machine translation).
(Continued)

*Primary Examiner* — David R Lazaro
(74) *Attorney, Agent, or Firm* — Fish & Richardson P.C.

(57) ABSTRACT

A stream information setting unit sets, with respect to a plurality of information collection object apparatuses, either a first transmission setting of a first data transmission of which a transmission cycle is designated or a second transmission setting of a second data transmission which uses a predetermined transmission cycle. A telemetry data receiving unit receives data from the information collection object apparatuses by the first data transmission executed according to the first transmission setting and the second data transmission executed according to the second transmission setting. A measuring unit measures a transmission time of data by the first data transmission. A comparing unit determines whether or not the transmission time measured by the measuring unit exceeds the designated transmission cycle. A cycle changing unit extends a transmission cycle of the second data transmission when the comparing unit determines that the transmission time exceeds the transmission cycle.

12 Claims, 6 Drawing Sheets

(56) References Cited

U.S. PATENT DOCUMENTS

| | | |
|---|---|---|
| 11,115,306 B2* | 9/2021 | Oshiba .................... H04L 47/00 |
| 11,372,861 B2* | 6/2022 | Chiu .................... G06F 16/2282 |
| 2013/0121165 A1* | 5/2013 | Okazaki ................ H04L 1/0001 |
| | | 370/241.1 |
| 2020/0092190 A1* | 3/2020 | Oshiba .................... H04L 47/00 |
| 2021/0243094 A1* | 8/2021 | Holness .............. H04L 41/0654 |
| 2022/0012248 A1* | 1/2022 | Chiu ................. G06F 16/24568 |
| 2024/0073156 A1* | 2/2024 | Singh .................... H04L 47/805 |
| 2024/0129217 A1* | 4/2024 | Nakatsukasa ........... H04L 43/16 |

OTHER PUBLICATIONS

Sato, "About Telemetry," Japan Network Operators' Group (JANOG) Telemetry Working Group 1st Meeting, May 18, 2018, 69 pages (with machine translation).

* cited by examiner

INFORMATION PROCESSING DEVICE, INFORMATION PROCESSING METHOD AND INFORMATION PROCESSING PROGRAM

CROSS-REFERENCE TO RELATED APPLICATIONS

This application is a National Stage application under 35 U.S.C. § 371 of International Application No. PCT/JP2021/005761, having an International Filing Date of Feb. 16, 2021.

The disclosure of the prior application is considered part of the disclosure of this application, and is incorporated by reference in its entirety into this application.

TECHNICAL FIELD

The present invention relates to an information processing apparatus, an information processing method, and an information processing program.

BACKGROUND ART

In recent years, telemetry which enables apparatus information to be collected in a shorter cycle by transferring information using apparatus-driven push transfer has been attracting attention. Telemetry refers to a system for collecting data from a measuring instrument or the like at a remote location using a communication line.

Since conventional acquisition of apparatus information using MIB (Management Information Base) information of SNMP (Simple Network Management Protocol) is pull acquisition, a data request is required every time information is acquired and, due to the use of a legacy format, an apparatus is subjected to a heavy load. For this reason, the reality has been that information is collected at sufficient intervals. On the other hand, in the case of telemetry, given that telemetry is a push technique and a processing load on an apparatus is reduced by adopting a new format, short intervals on the order of milliseconds can be designated as an apparatus specification. Accordingly, telemetry is expected to be utilized as a technique for further improving resolution of network visualization.

In telemetry, in order to perform a push-type information transfer, a transmission interval of a data stream is registered in a collection object apparatus on an information transmission side or in an information collection-side system called a collector.

CITATION LIST

Non Patent Literature

[NPL 1] Tetsuhiro Sato, "On Telemetry", [online], May 18, 2018, Cisco, [Retrieved on Jan. 25, 2021, Internet <URL: https://www.janog.gr.jp/wg/telemetry-wg/wp-content/uploads/2018/06/20180518 Cisco_Telemetry_WG01.pdf>

[NPL 2] Masaharu Inoue, et al., "How to use Telemetry [For Beginners]", [online], Jul. 18, 2018, businessnetwork.jp, [Retrieved on Jan. 25, 2021, Internet <URL: https://businessnetwork.jp/Detail/tabid/65/artid/6206/Default.aspx>

SUMMARY OF INVENTION

Technical Problem

However, in telemetry, when a range of apparatus information acquired when actually starting data transmission is large, it takes an immense amount of time to transmit all of the information of an apparatus to a collector. Therefore, there is a possibility of an occurrence of an event in which an elapsed time of data transmission from a collection object apparatus to the collector exceeds a registered transmission interval of a data stream. When the elapsed time of data transmission exceeds the transmission interval of the data stream, network monitoring may possibly be adversely affected in the form of, for example, a skipped transmission interval cycle. This event is particularly likely to occur in an edge apparatus in which a sub-interface such as a VLAN (Virtual Local Area Network) interface is set for each user. This is because, in the case of an apparatus in which a sub-interface is set for each user, information of all of the sub-interfaces is to be transmitted in order to collect information for each user and the amount of data to be transmitted increases.

For example, as a result of verification in a case where telemetry is transmitted by accommodating 20,000 users using a specific router, depending on the range of information to be acquired, one transmission may require approximately one minute or more. However, it is expected that an elapsed time of the data transmission or transmission time is to vary depending on a load state of an apparatus such as a CPU (Central Processing Unit) usage rate of the apparatus. For example, in the case of collecting all of the pieces of information of all interfaces, the transmission time was 2 minutes 30 seconds and the CPU utilization rate was 53%. Furthermore, when collecting pieces of information such as the number of input/output packets or the number of bytes of all interfaces, an error counter and a drop counter, the transmission time was 1 minute 9 seconds and the CPU utilization rate was 33%. When collecting information on the number of input packets of all interfaces, the transmission time was 1 minute 7 seconds, and the CPU utilization rate was 31%. In this manner, in any case, one transmission requires one minute or more.

The present invention was made in view of the points described above and an object thereof is to acquire apparatus information of an information collection object without any loss while observing a monitoring cycle.

Solution to Problem

In order to solve the problem and achieve the purpose described above, a stream information setting unit sets, with respect to a plurality of information collection object apparatuses, either a first transmission setting of a first data transmission of which a transmission cycle is designated or a second transmission setting of a second data transmission which uses a predetermined transmission cycle. A data receiving unit receives data from the information collection object apparatuses by the first data transmission executed according to the first transmission setting and the second data transmission executed according to the second transmission setting. A measuring unit measures a transmission time of data by the first data transmission. A comparing unit determines whether or not the transmission time measured by the measuring unit exceeds the designated transmission cycle. A cycle changing unit extends a transmission cycle of the second data transmission when the comparing unit determines that the transmission time exceeds the transmission cycle.

Advantageous Effects of Invention

According to the present invention, apparatus information of an information collection object can be acquired without any loss while observing a monitoring cycle.

DESCRIPTION OF EMBODIMENTS

An embodiment of an information processing apparatus, an information processing method, and an information processing program disclosed in the present application will be described below in detail with reference to the drawings. It should be noted that the information processing apparatus, the information processing method, and the information processing program disclosed in the present application are not intended to be limited by the following embodiment.

Embodiment

[Information Collection System]

Figure 1:
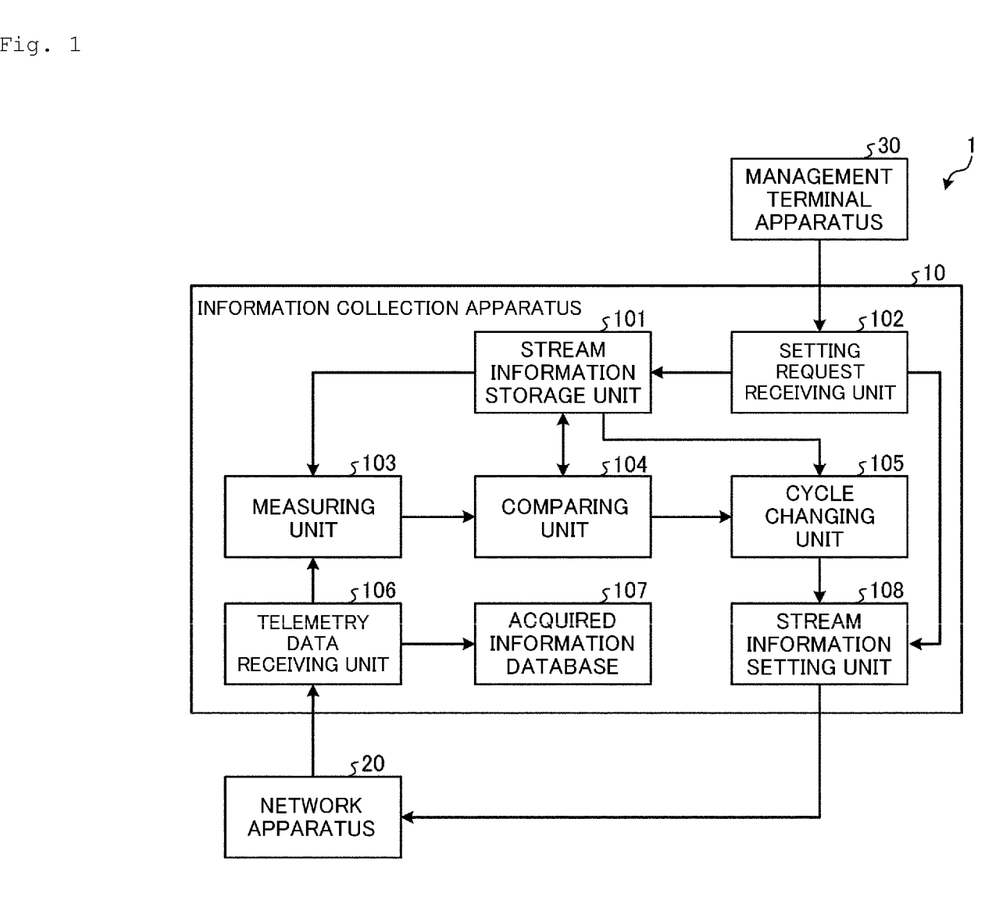
FIG. 1 is a block diagram of an information collection system according to an embodiment.

FIG. 1 is a block diagram showing an information collection system according to the embodiment. As shown in FIG. 1, an information collection system 1 according to the present embodiment includes an information collection apparatus 10 which is an information processing apparatus, a network apparatus 20 having an information collection object apparatus to be an object of information collection by the information collection apparatus 10, and a management terminal apparatus 30. The information collection apparatus 10, the network apparatus 20, and the management terminal apparatus 30 are connected via a network. In this case, the information collection system 1 is a system which collects data of the network apparatus 20 by telemetry. Hereinafter, data collected by telemetry will be called "telemetry data".

The network apparatus 20 includes a plurality of information collection object apparatuses to be objects of information collection by telemetry. In the network apparatus 20 according to the present embodiment, sub-interfaces are set for each user, and each sub-interface serves as an information collection object apparatus.

The network apparatus 20 according to the present embodiment receives, from the information collection apparatus 10, transmission settings of telemetry data including identification information, a designated range of acquired information, and a transmission interval requirement with respect to each information collection object apparatus. Hereinafter, a flow of data transmitted according to a transmission setting of telemetry data will be called a "stream".

In addition, the transmission setting with respect to a stream will be called "stream information". In other words, one piece of stream information exists for each stream. In addition, information of information collection object apparatuses corresponding to each stream is collected as telemetry data. In the network apparatus 20 according to the present embodiment, stream information is set for each sub-interface and information is collected by each stream.

The network apparatus 20 transmits information in a designated range in an information collection object apparatus to the information collection apparatus 10 according to a transmission interval requirement designated by the stream information. Furthermore, when receiving an instruction to change the transmission interval with respect to a specific stream from the information collection apparatus 10, the network apparatus 20 changes the transmission interval in the stream information with respect to the specific stream, forms a stream according to the stream information, and transmits information in the designated range to the information collection apparatus 10.

The management terminal apparatus 30 is a terminal operated by a manager who performs maintenance or the like of the information collection system 1. The management terminal apparatus 30 requests setting of stream information by transmitting the stream information to the information collection apparatus 10. In some cases, a transmission interval requirement included in each piece of stream information designates a specific transmission cycle, but in other cases, a specific transmission cycle is not designated and a predetermined cycle is used. In other words, for each stream, the management terminal apparatus 30 transmits stream information including designation of a transmission cycle or non-designation of a transmission cycle as a transmission interval requirement to the information collection apparatus 10.

In the following description, a stream of which a transmission cycle is designated will be referred to as "a stream having a designated cycle" and a stream of which a transmission cycle is not designated will be referred to as "a stream without a designated transmission cycle". In addition, a cycle designated in a stream having a designated cycle will be called a "designated cycle" and a cycle of a stream without a designated transmission cycle will be called a "set cycle". A stream having a designated cycle is a stream for collecting information from an information collection object apparatus to be collected by strictly designating the cycle. A stream without a designated transmission cycle is a stream for collecting information from an information collection object apparatus from which information is desirably routinely collected, albeit under less stringent conditions than that of a stream having a designated cycle.

A stream information setting request from the management terminal apparatus 30 may be transmitted to the information collection apparatus 10 by the manager using an input apparatus such as a keyboard. Alternatively, an OS (Operating System) running on the management terminal apparatus 30 may transmit a stream information setting request to the information collection apparatus 10 as a host OS.

[Information Collection Apparatus]

The information collection apparatus 10 will be described. As shown in FIG. 1, the information collection apparatus 10 includes a stream information storage unit 101, a setting request receiving unit 102, a measuring unit 103, a comparing unit 104, a cycle changing unit 105, a telemetry data receiving unit 106, an acquired information database 107, and a stream information setting unit 108.

The setting request receiving unit 102 receives a setting request of stream information with respect to each collection object apparatus arranged in the network apparatus 20 from the management terminal apparatus 30. In addition, the setting request receiving unit 102 outputs each piece of acquired stream information to the stream information storage unit 101 and the stream information setting unit 108.

The stream information storage unit 101 receives input of stream information with respect to each collection object apparatus from the setting request receiving unit 102. In addition, the stream information storage unit 101 stores and holds each piece of acquired stream information. The stream information held by the stream information storage unit 101 includes one or more pieces of stream information of a stream having a designated cycle and further includes one or more pieces of stream information of a stream without a set transmission cycle.

The stream information setting unit 108 receives input of stream information with respect to each collection object apparatus from the setting request receiving unit 102. In addition, for each information collection object apparatus corresponding to identification information designated by each piece of stream information, the stream information setting unit 108 transmits information on a designated range of acquired information and information of a transmission interval to the network apparatus 20 and causes the network apparatus 20 to store the information. Accordingly, the stream information setting unit 108 sets the network apparatus 20 to transmit information in a range designated by each information collection object apparatus to the information collection apparatus 10 at the designated transmission interval. In this case, the stream information setting unit 108 sets a designated cycle as a transmission interval with respect to a stream having a designated cycle. On the other hand, with respect to a stream without a set transmission cycle, the stream information setting unit 108 sets a predetermined cycle as a transmission interval.

Subsequently, when an actual transmission time exceeds a designated cycle in a stream having a designated cycle, the stream information setting unit 108 receives an instruction to change the set cycle of the stream together with a designation of any of the streams without a set transmission cycle from the cycle changing unit 105. In addition, the stream information setting unit 108 sets the network apparatus 20 so that the set cycle of the designated stream without a set transmission cycle is changed to the designated set cycle. Accordingly, the stream information setting unit 108 extends the set cycle of the designated stream without a set transmission cycle.

In other words, the stream information setting unit 108 sets, with respect to a plurality of information collection object apparatuses, either a first transmission setting of a first data transmission in which a transmission cycle is designated or a second transmission setting of a second data transmission using a predetermined transmission cycle. In this case, a stream having a designated cycle corresponds to an example of the first data transmission and stream information of the stream having a designated cycle corresponds to the first transmission setting. In addition, a stream without a designated transmission cycle corresponds to an example of the second data transmission and stream information of the stream without a designated transmission cycle corresponds to the second transmission setting. Furthermore, the stream information setting unit 108 performs range designation of acquired information and setting of a transmission cycle of each of the first data transmission and the second data transmission as the first transmission setting and the second transmission setting.

The telemetry data receiving unit 106 receives telemetry data of each information collection object apparatus transmitted from the network apparatus 20 by a stream. In addition, the telemetry data receiving unit 106 causes telemetry data to be stored in the acquired information database 107 for each information collection object apparatus.

The telemetry data receiving unit 106 also notifies the measuring unit 103 of a start of reception of the telemetry data of each stream. In addition, the telemetry data receiving unit 106 notifies the measuring unit 103 of an end of reception of the telemetry data of each stream.

Alternatively, a system for predicting a transmission time of the telemetry data of each stream can also be adopted. In this case, for example, the telemetry data receiving unit 106 sequentially transmits a transfer rate of the received telemetry data to the measuring unit 103.

In other words, the telemetry data receiving unit 106 receives data from the information collection object apparatuses due to the first data transmission executed according to the first transmission setting and the second data transmission executed according to the second transmission setting.

The measuring unit 103 measures a transmission time of all pieces of telemetry data by a stream having a designated cycle. In the following description, the transmission time of all pieces of telemetry data by a stream will simply be referred to as a "transmission time". In other words, the measuring unit 103 measures the transmission time of data by the first data transmission.

For example, the measuring unit 103 checks a transmission interval requirement of each stream stored in the stream information storage unit 101 and specifies a stream having a designated cycle. In addition, the measuring unit 103 specifies reception of telemetry data of a stream having a designated cycle from a notification of a start of reception of telemetry data from the telemetry data receiving unit 106 and starts time measurement. Subsequently, when receiving a notification of an end of reception of the telemetry data of the stream, the measuring unit 103 terminates the time measurement and sets a measured time as the transmission time of the specified stream having a designated cycle. Subsequently, the measuring unit 103 outputs the measured transmission time of each stream having a designated cycle to the comparing unit 104.

Alternatively, as described above, the measuring unit 103 may predict the transmission time. For example, the measuring unit 103 checks a transmission interval requirement of each stream stored in the stream information storage unit 101 and specifies a stream having a designated cycle. Next, the measuring unit 103 acquires information of a designated range of acquired information of each stream having a designated cycle from the stream information storage unit 101 and calculates an overall data amount to be transmitted by each stream having a designated cycle during one transmission interval. The measuring unit 103 also receives an input of a transfer amount of telemetry data having been transmitted from each stream having a designated cycle from the telemetry data receiving unit 106. In addition, the measuring unit 103 calculates a transmission time in one telemetry data transmission based on the overall data amount transmitted by each stream having a designated cycle during one transmission interval and a transfer rate at that time point.

The comparing unit 104 checks a transmission interval requirement in each piece of stream information stored in the stream information storage unit 101 and acquires a designated cycle of a stream having a designated cycle. In addition, the comparing unit 104 receives an input of a transmission time of each stream having a designated cycle from the measuring unit 103. Furthermore, the comparing unit 104 determines whether or not the transmission time at that time point of each stream having a designated cycle exceeds the designated cycle. When there is no stream having a designated cycle in which the transmission time at that time point exceeds the designated cycle, the comparing unit 104 waits while maintaining the current set cycle.

On the other hand, when there are one or more streams having a designated cycle in which the transmission time at that time point exceeds the designated cycle, the comparing unit 104 outputs an instruction to change the set cycle to the cycle changing unit 105. When the transmission time input from the measuring unit 103 once again after the set cycle is changed still exceeds the designated cycle, the comparing unit 104 once again outputs an instruction to change the set cycle to the cycle changing unit 105. In other words, the comparing unit 104 determines whether or not the transmission time measured by the measuring unit 103 exceeds the designated transmission cycle.

The cycle changing unit 105 receives an instruction to change the set cycle from the comparing unit 104. The cycle changing unit 105 checks a transmission interval requirement in each piece of stream information stored in the stream information storage unit 101 and specifies a stream without a set transmission cycle. Next, the cycle changing unit 105 selects one stream from the streams without a set transmission cycle.

Next, the cycle changing unit 105 acquires a set cycle at that time point from the transmission interval requirement of the stream without a set transmission cycle having been selected among the pieces of stream information stored in the stream information storage unit 101. In addition, the cycle changing unit 105 adds a predetermined extension time to the set cycle at that time point of the selected stream and determines a new set cycle. Subsequently, the cycle changing unit 105 outputs an instruction to the stream information setting unit 108 to change the set cycle of the selected stream to the newly-determined set cycle. In other words, when the comparing unit 104 determines that the transmission time exceeds the transmission cycle, the cycle changing unit 105 extends the transmission cycle of the second data transmission.

In addition, the cycle changing unit 105 updates the information of the set cycle registered as a transmission interval requirement in the stream information of the selected stream among the pieces of stream information stored in the stream information storage unit 101 to the newly-determined set cycle.

In the present embodiment, while the cycle changing unit 105 has been described in terms of a configuration in which the cycle changing unit 105 adds a time of a predetermined length when extending a transmission cycle of a stream without a set transmission cycle, the extension time of the transmission interval may be determined by another method. For example, the cycle changing unit 105 may increase the set cycle at that time point by a predetermined ratio.

Figure 2:
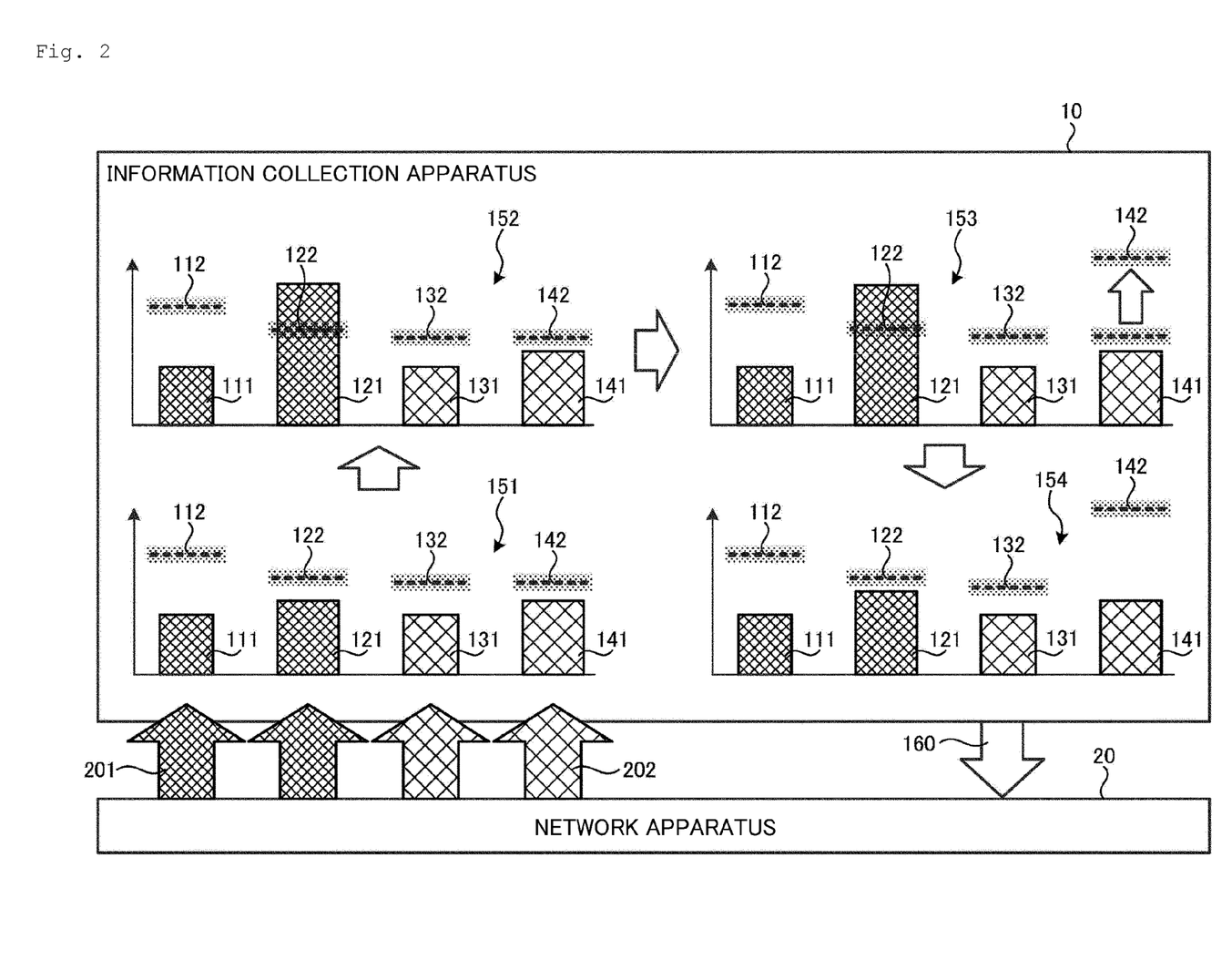
FIG. 2 is a diagram for explaining a method of keeping a transmission time within a designated cycle by extending a set time.

FIG. 2 is a diagram for explaining a method of keeping a transmission time within a designated cycle by extending a set time. A concept of a method of keeping a transmission time within a designated cycle according to the present embodiment will be described with reference to FIG. 2.

Graphs 151 to 153 represent changes in transmission time accompanying changes in a set cycle. In order to represent the fact that a transmission time changes due to the information collection apparatus 10 changing a set cycle, the graphs 151 to 153 are described in the information collection apparatus 10. In the graphs 151 to 153, an ordinate represents transmission time and an abscissa represents a type of a stream. Streams 111 and 121 are streams having a designated cycle, and streams 131 and 141 are streams without a set transmission cycle.

With respect to the network apparatus 20, a setting 160 is performed in which a designated cycle is allocated as a transmission interval to the streams having a designated cycle, and a predetermined cycle is allocated as a set cycle as a transmission interval to the streams without a set transmission cycle. In addition, the network apparatus 20 transmits telemetry data by a stream 201 having a designated cycle and transmits telemetry data by a stream 202 without a set transmission cycle.

In this initial state, as shown in the graph 151, a designated cycle 112 is set to the stream 111, a designated cycle 122 is set to the stream 121, a set cycle 132 being a predetermined cycle is set to the stream 131, and a set cycle 142 being a predetermined cycle is set to the stream 141. At this stage, none of the transmission times of the respective streams 111, 121, 131, 141 have exceeded the designated cycle 112, the designated cycle 122, the set cycle 132, and the set cycle 142 being respective transmission intervals thereof.

Subsequently, after a lapse of time, the transmission time of the stream 121 exceeds the designated cycle 122 as shown in the graph 152. When the transmission time of the stream 121 exceeds the designated cycle 122, the cycle changing unit 105 of the information collection apparatus 10 selects the stream 141 without a designated transmission cycle as shown in the graph 153 and changes the set cycle 142 so as to extend the transmission interval of the stream 141 by a predetermined time. The stream information setting unit 108 performs the setting 160 with respect to the network apparatus 20 so that the setting of the stream 141 becomes the changed set cycle 142.

When the transmission interval of the stream 141 is extended, the processing load of the stream 141 in the network apparatus 20 decreases. Accordingly, the processing amount of the stream 121 in the network apparatus 20 can be increased and the transmission time of the stream 121 can be shortened. Therefore, it is expected that the transmission time of the stream 121 is kept within the designated cycle 122 as shown in the graph 154.

When the transmission time of each stream having a designated cycle does not become equal to or shorter than the designated cycle after the set cycle is changed, the cycle changing unit 105 once again receives an instruction to change the set cycle from the comparing unit 104. In addition, the cycle changing unit 105 selects a next stream from streams without a set transmission cycle. In the present embodiment, the cycle changing unit 105 selects a stream without a set transmission cycle in a round-robin manner in accordance with a predetermined rule. For example, a number is assigned as identification information of a set cycle, the cycle changing unit 105 selects a stream in an ascending order of the numbers and, after selecting a stream with a largest number among streams without a set transmission cycle, returns to a first number and repeats the sequential selection of streams in the order of the numbers. In other words, when a same extension is added to all second data transmissions, the cycle changing unit 105 once again sequentially selects one second data transmission at a time from the plurality of second data transmissions and once again extends the transmission cycle of the selected second data transmission.

In addition, the cycle changing unit 105 adds a predetermined time being a predetermined extension time to the set cycle at that time point and determines a new set cycle. Subsequently, the cycle changing unit 105 outputs an instruction to the stream information setting unit 108 to change the set cycle of the selected stream to the newly-determined set cycle. In addition, the cycle changing unit 105 updates the information of the set cycle registered as the stream information of the selected stream among the pieces of stream information stored in the stream information storage unit 101 to the newly-determined set cycle.

Figure 3:
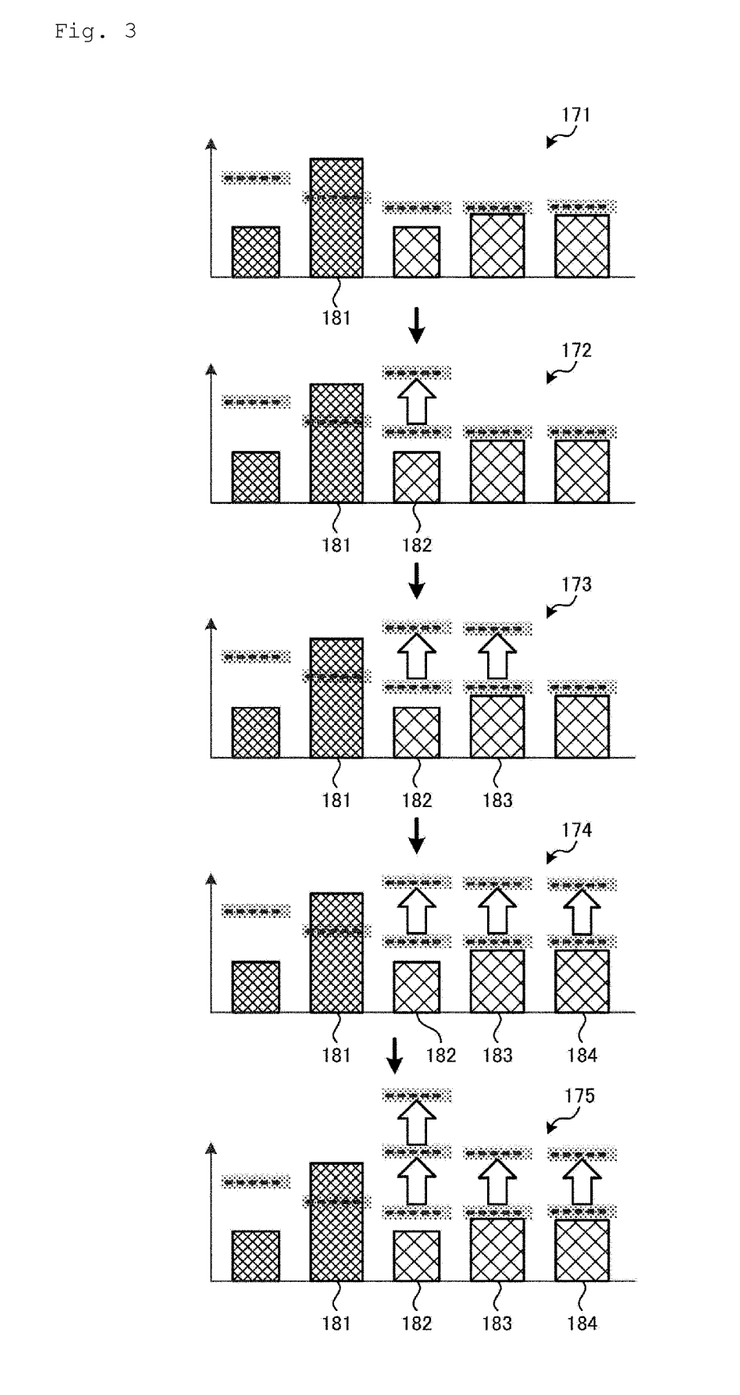
FIG. 3 is a diagram showing an example of a procedure of extending a set cycle by an information collection apparatus according to the embodiment.

FIG. 3 is a diagram showing an example of a procedure of extending a set cycle by the information collection apparatus according to the embodiment. Referring to FIG. 3, the procedure of extending a set cycle with respect to a plurality of streams by the cycle changing unit 105 will be described.

Graphs 171 to 175 in FIG. 3 represent transitions of set cycles of a plurality of streams. In Graphs 171 to 175, an ordinate represents transmission time and an abscissa represents each stream. Two streams from the left when facing a paper surface in the graphs 171 to 175 represent streams having a designated cycle. In addition, three streams from the right when facing the paper surface in the graphs 171 to 175 represent streams without a set transmission cycle. Furthermore, a dotted line added to each stream represents a designated cycle or a set cycle.

As shown in the graph 171, a case where a transmission time of a stream 181 having a designated cycle exceeds the designated cycle will be described. In this case, the cycle changing unit 105 selects a stream 182 shown in the graph 172 from the streams without a set transmission cycle. In addition, the cycle changing unit 105 extends the set cycle of the stream 182 by a predetermined time.

Next, when the transmission time of the stream 181 exceeds the designated cycle even when the set cycle of the stream 182 has been extended, the cycle changing unit 105 selects a stream 183 shown in the graph 173 from the streams without a set transmission cycle. In addition, the cycle changing unit 105 extends the set cycle of the stream 183 by a predetermined time.

Next, when the transmission time of the stream 181 exceeds the designated cycle even when the set cycles of the streams 182 and 183 have been extended, the cycle changing unit 105 selects a stream 184 shown in the graph 174 from the streams without a set transmission cycle. In addition, the cycle changing unit 105 extends the set cycle of the stream 184 by a predetermined time.

Next, when the transmission time of the stream 181 exceeds the designated cycle even when the set cycles of the streams 182 to 184 have been extended, the cycle changing unit 105 has already selected each of the streams 181 to 183 once. Therefore, the cycle changing unit 105 returns to the beginning and selects the stream 181 as shown in the graph 175. In addition, the cycle changing unit 105 further extends the set cycle of the stream 181 by a predetermined time. In this manner, the cycle changing unit 105 according to the present embodiment repeats the sequential selection of the streams 181 to 183 in a round-robin manner.

The cycle changing unit 105 repeats extension of a set cycle until the transmission time of each stream having a designated cycle becomes equal to or less than the designated cycle. In other words, the cycle changing unit 105 repeats the sequential selection of one second data transmission at a time from the plurality of second data transmissions and the extension of the transmission cycle of the selected second data transmission until the transmission time falls within the transmission cycle.

However, in the present embodiment, the cycle changing unit 105 is given, in advance, an upper limit to the number of times the set cycle can be changed. When the number of changes to a set cycle reaches the upper limit, the cycle changing unit 105 performs error processing. Specifically, the cycle changing unit 105 returns the set cycle to a predetermined initial setting. Alternatively, as error processing, the cycle changing unit 105 may notify a manager of the fact that a transmission time has exceeded a designated cycle by transmitting the fact to the management terminal apparatus 30.

[Processing Procedure of Information Collection Processing]

Figure 4:
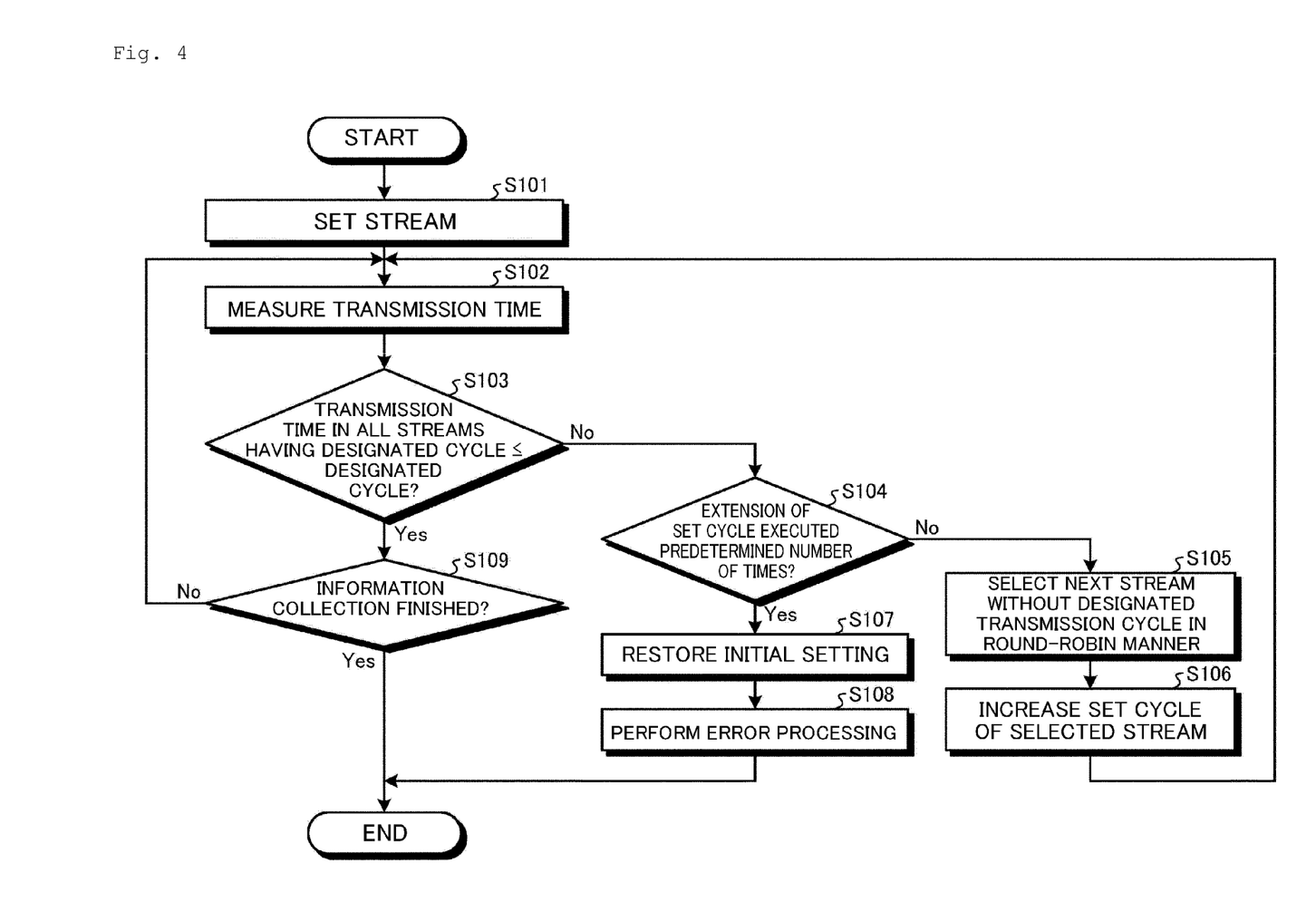
FIG. 4 is a flowchart of information collection processing of telemetry data by the information collection apparatus according to the embodiment.

FIG. 4 is a flowchart of information collection processing of telemetry data by the information collection apparatus according to the embodiment. Next, a flow of information collection processing of telemetry data by the information collection apparatus 10 according to the present embodiment will be explained with reference to FIG. 4.

The setting request receiving unit 102 receives a setting request of stream information for each information collection object apparatus included in the network apparatus 20 from the management terminal apparatus 30. The stream information setting unit 108 sets a stream for each information collection object apparatus to the network apparatus 20 according to the stream information acquired from the setting request receiving unit 102 (step S101).

The network apparatus 20 transmits each piece of information of the information collection object apparatuses to the information collection apparatus 10 according to the setting of each stream. The telemetry data receiving unit 106 receives telemetry data transmitted from the network apparatus 20 by each stream and stores the telemetry data in the acquired information database 107. The measuring unit 103 checks a reception state of telemetry data of each stream of the telemetry data receiving unit 106 and measures a transmission time of telemetry data of each stream having a designated cycle (step S102).

The comparing unit 104 compares the designated cycle of each stream having a designated cycle stored in the stream information storage unit 101 with the transmission time of each stream having a designated cycle as measured by the measuring unit 103. In addition, the comparing unit 104 determines whether or not the transmission time is equal to or less than the designated cycle in all of the streams having a designated cycle (step S103).

When there is one or more streams of which a transmission time exceeds the designated cycle among the streams having a designated cycle (step S103: negative), the comparing unit 104 instructs the cycle changing unit 105 to extend the set cycle. The cycle changing unit 105 receives the instruction to extend a set cycle and determines whether or not an extension of the set cycle has already been executed a predetermined number of times (step S104).

When the number of executions of extension of the set cycle has not reached a predetermined number of times (step S104: negative), the cycle changing unit 105 selects a next stream without a designated transmission cycle in a round-robin manner from streams without a set transmission cycle (step S105).

Next, the cycle changing unit 105 extends the set cycle of the selected stream by a predetermined time (step S106). Subsequently, the information collection processing returns to step S102.

On the other hand, when the extension of the set cycle has already been executed the predetermined number of times (step S104: positive), the cycle changing unit 105 returns the set cycle of the storm without a set transmission cycle to the initial setting (step S107).

Subsequently, the cycle changing unit 105 executes error processing (step S108). In this case, even after the error processing is performed, the information collection apparatus 10 may continue collecting telemetry data in a state where the set cycle of the storm without a set transmission cycle has been returned to the initial setting.

On the other hand, when the transmission time is within the designated cycle in all the streams having a designated cycle (step S103: positive), the comparing unit 104 maintains the transmission interval of each stream in the state at that time point. Subsequently, the telemetry data receiving unit 106 determines whether or not information collection by telemetry is to be ended based on whether or not an end instruction from a manager is received or the like (step S109).

When the information collection processing by telemetry is to be continued (step S109: negative), the information collection processing returns to step S102. On the other hand, when the information collection processing by telemetry is to be ended (step S109: positive), the telemetry data receiving unit 106 stops reception of telemetry data.

[Effect of Information Collection Processing]

As described above, when a transmission time of telemetry data of a stream of which a transmission cycle is strictly designated due to a reason such as an importance of telemetry data to be collected being high or the like exceeds a set cycle, the information collection apparatus 10 according to the present embodiment extends a set cycle of a stream without a set transmission cycle in which importance of telemetry data to be collected is considered low. Accordingly, the information collection apparatus 10 can keep a transmission time of data of a stream having a designated cycle within the designated cycle. Therefore, apparatus information of an information collection object can be acquired without any loss while observing a monitoring cycle and reliability of the information collection system 1 can be improved.

[System Configuration and the Like]

Each component of each illustrated apparatus is a functional conceptual component and does not necessarily need to be physically configured as illustrated in the drawings. In other words, a specific form of distribution and integration of the respective apparatuses is not limited to the form illustrated in the drawings, and all or some of the apparatuses can be distributed or integrated functionally or physically in any units according to various loads, use situations, and the like. Furthermore, all or some of processing functions to be performed in each apparatus can be realized by a CPU (Central Processing Unit) and a program analyzed and executed by the CPU, or can be realized as hardware using a wired logic.

In addition, among the respective processing steps described in the embodiment, all or a part of processing steps described as being automatically performed can be manually performed or, alternatively, all or a part of processing steps described as being manually performed can be automatically performed by known methods. Furthermore, information including processing procedures, control procedures, specific names, various data and parameters having been described above or shown in the drawings may be arbitrarily changed unless otherwise described.

Figure 5:
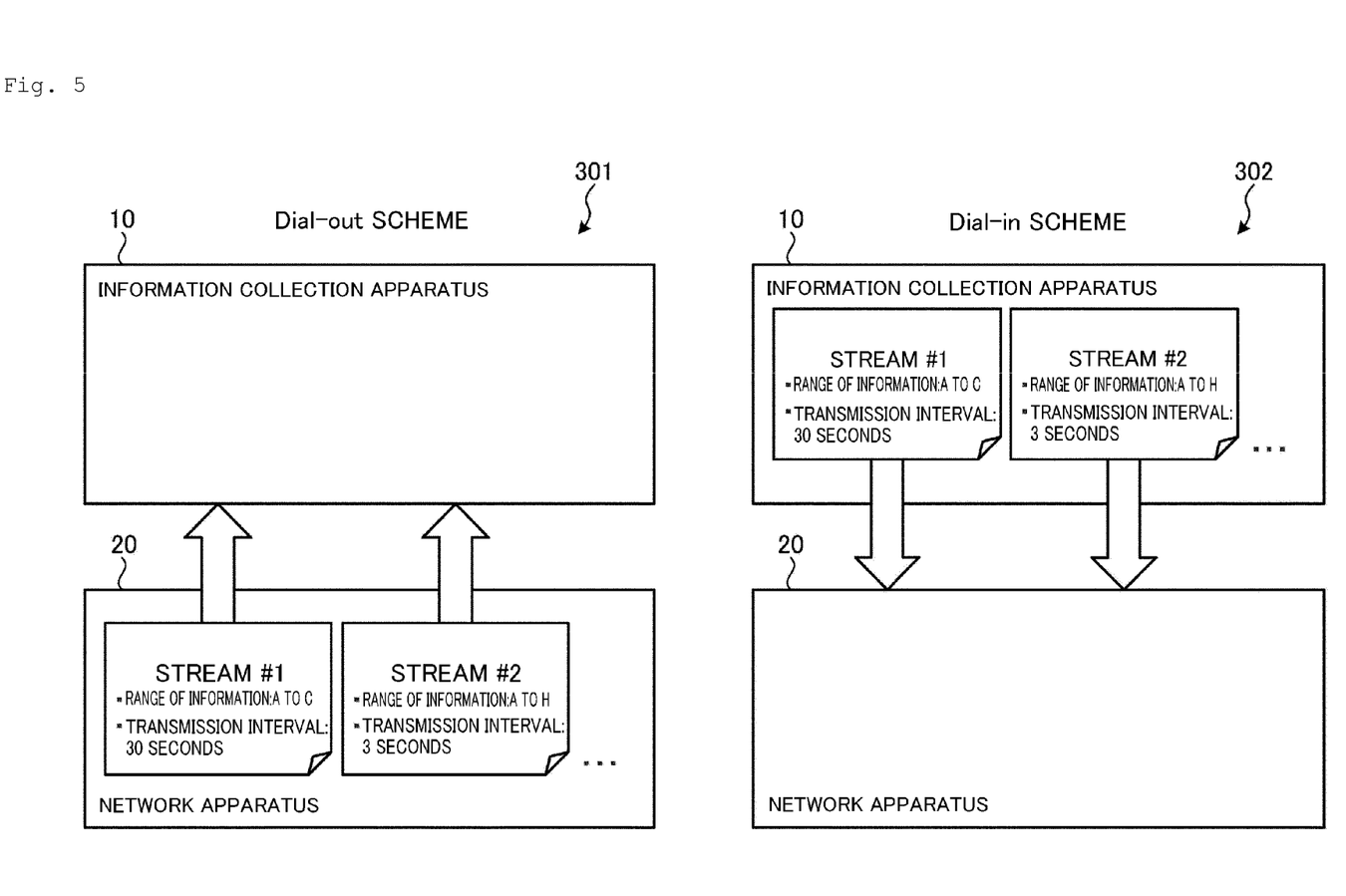
FIG. 5 is a diagram for explaining a storage location of stream information.

FIG. 5 is a diagram for explaining a storage location of stream information. In the embodiment described above, a configuration in which telemetry data is collected using a Dial-out method has been explained. In other words, as depicted in a configuration 301, a configuration has been described in which the information collection apparatus 10 sets stream information including a range of acquired information and a transmission interval requirement of each stream to the network apparatus 20 and the network apparatus 20 transmits telemetry data to the information collection apparatus 10 according to the set stream information.

However, the configuration is not restrictive and, for example, the information collection system 1 may use a Dial-in system as depicted in a configuration 302. In this case, the information collection apparatus 10 sets stream information including a range of acquired information and a transmission interval requirement of each stream to itself. In addition, the information collection apparatus 10 may transmit a data transmission request to the network apparatus 20 according to the stream information and collect telemetry data by each stream formed by the network apparatus 20.

[Program]

As an embodiment, the information collection apparatus 10 can be implemented by installing an information processing program for executing the information processing described above in a desired computer as packaged software or on-line software. For example, an information processing apparatus can be caused to function as the information collection apparatus 10 by having the information processing apparatus execute the information processing program described above. An "information processing apparatus" as used herein may include a desktop or laptop personal computer in addition to a server computer. Furthermore, information processing apparatuses also include a mobile communication terminal such as a smart phone, a mobile phone, or a PHS (Personal Handy-phone System), a slate terminal such as a PDA (Personal Digital Assistant), and the like.

In addition, with a terminal apparatus used by a user being a client, the information collection apparatus 10 can be implemented as a management server apparatus for providing the client with a service related to the management processing described above. For example, the management server apparatus is implemented as a server apparatus which receives a configuration input request as an input and which provides a management service for performing configuration input. In this case, the management server apparatus may be implemented as a Web server or may be implemented as a cloud for providing service related to the management processing described above by outsourcing.

Figure 6:
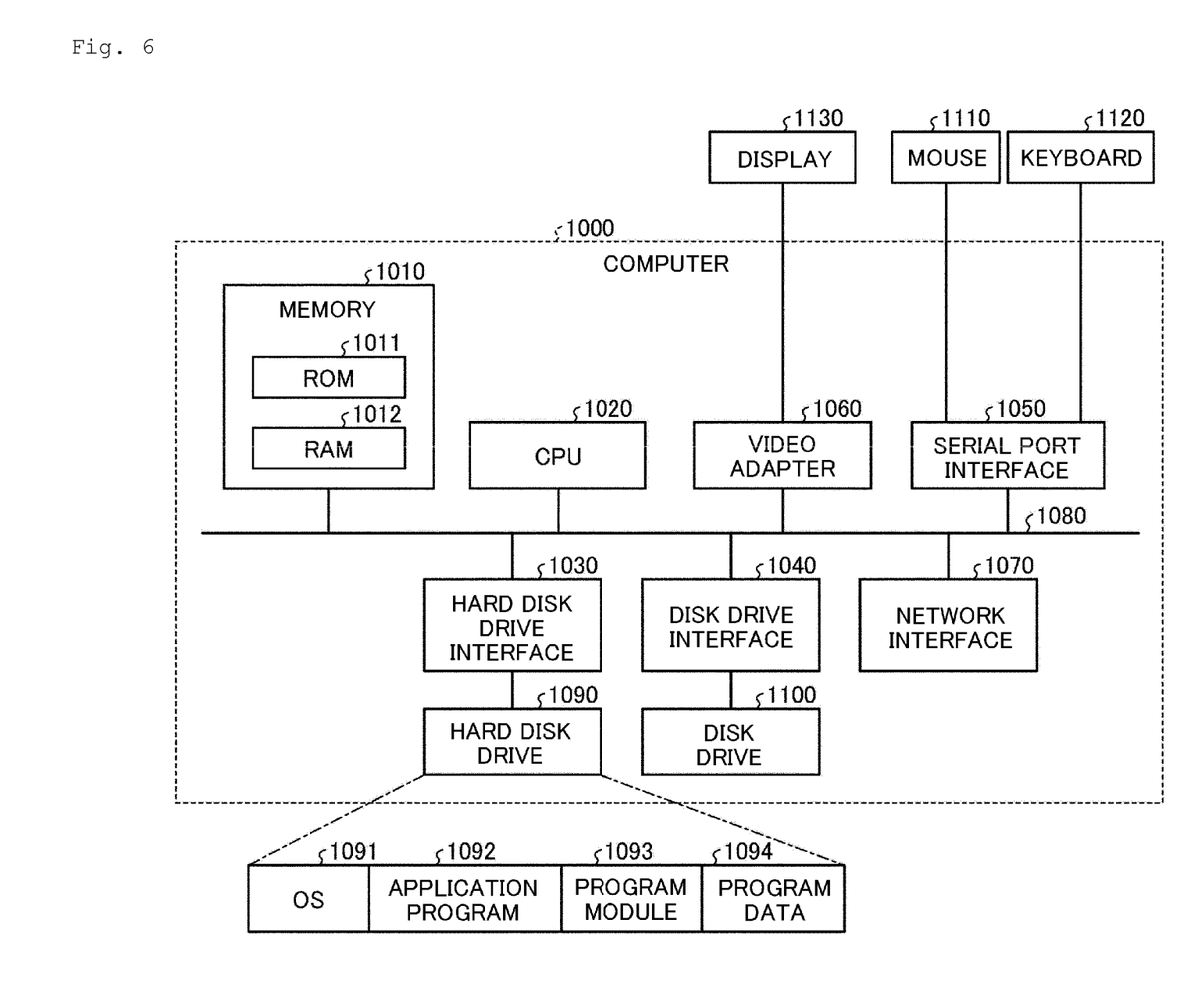
FIG. 6 is a diagram showing an example of a computer for executing an information processing program for information collection processing.

FIG. 6 is a diagram showing an example of a computer that executes an information processing program for information collection processing. For example, a computer 1000 includes a memory 1010 and a CPU 1020. The computer 1000 also includes a hard disk drive interface 1030, a disk drive interface 1040, a serial port interface 1050, a video adapter 1060, and a network interface 1070. Each of these units is connected by a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100.

For example, a removable storage medium such as a magnetic disk or an optical disk is to be inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. In other words, an information processing program defining each processing step of the information collection apparatus 10 which has functions equivalent to those of the information collection apparatus 10 is implemented as the program module 1093 which describes a code that can be executed by the computer. The program module 1093 is stored in, for example, the hard disk drive 1090. For example, the program module 1093 for executing processing similar to the processing executed by the functional components in the information collection apparatus 10 is stored in the hard disk drive 1090. The hard disk drive 1090 may be replaced with an SSD (Solid State Drive).

In addition, setting data to be used in processing of the embodiment described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the processing of the embodiment described above.

The program module 1093 or the program data 1094 is not limited to being stored in the hard disk drive 1090 and may be stored in, for example, a detachable storage medium and read by the CPU 1020 via the disc drive 1100 or the like. Alternatively, the program module 1093 and the program data 1094 may be stored in another computer connected via a network (a LAN (Local Area Network), a WAN (Wide Area Network), or the like). In addition, the program module 1093 and program data 1094 may be read out from the other computer by the CPU 1020 via the network interface 1070.

REFERENCE SIGNS LIST

1 Information collection system
10 Information collection apparatus
20 Network apparatus
30 Management terminal apparatus
101 Stream information storage unit
102 Setting request receiving unit
103 Measuring unit
104 Comparing unit
105 Cycle changing unit
106 Telemetry data receiving unit
107 Acquired information database
108 Stream information setting unit

The invention claimed is:

1. An information processing apparatus, comprising one or more processors, configured to:
set, with respect to a plurality of information collection object apparatuses, either a first transmission setting of a first data transmission of which a transmission cycle is designated or a second transmission setting of a second data transmission which uses a predetermined transmission cycle;
receive data from the information collection object apparatuses by the first data transmission executed according to the first transmission setting and the second data transmission executed according to the second transmission setting;
measure a transmission time of data by the first data transmission;
determine whether or not the measured transmission time exceeds the designated transmission cycle; and
extend a transmission cycle of the second data transmission when the determining that the transmission time exceeds the transmission cycle.

2. The information processing apparatus according to claim 1, configured to designate a range of acquired information and set a transmission cycle of each of the first data transmission and the second data transmission as the first transmission setting and the second transmission setting.

3. The information processing apparatus according to claim 1, configured to:
set the second data transmission to some of the information collection object apparatuses, and
repeat a selection of one second data transmission at a time from a plurality of second data transmissions and an extension of the transmission cycle of the selected second data transmission until the transmission time falls within the transmission cycle.

4. The information processing apparatus according to claim 3, configured to:
when a same extension is added to all of the second data transmissions, once again select one second data transmission at a time from the plurality of second data transmissions and once again extend the transmission cycle of the selected second data transmission.

5. An information processing method, comprising:
setting, with respect to a plurality of information collection object apparatuses, either a first transmission setting of a first data transmission of which a transmission cycle is designated or a second transmission setting of a second data transmission which uses a predetermined transmission cycle;
receiving data from the information collection object apparatuses by the first data transmission executed according to the first transmission setting and the second data transmission executed according to the second transmission setting;
measuring a transmission time of data by the first data transmission;
determining whether or not the measured transmission time exceeds the designated transmission cycle; and
extending a transmission cycle of the second data transmission when the transmission time exceeds the transmission cycle.

6. A non-transitory computer readable medium storing one or more instructions causing a computer to execute:
setting, with respect to a plurality of information collection object apparatuses, either a first transmission setting of a first data transmission of which a transmission cycle is designated or a second transmission setting of a second data transmission which uses a predetermined transmission cycle;
receiving data from the information collection object apparatuses by the first data transmission executed according to the first transmission setting and the second data transmission executed according to the second transmission setting;
measuring a transmission time of data by the first data transmission;
determining whether or not the measured transmission time exceeds the designated transmission cycle; and
extending a transmission cycle of the second data transmission when the transmission time exceeds the transmission cycle.

7. The information processing method according to claim 5, comprising:

designating a range of acquired information and setting a transmission cycle of each of the first data transmission and the second data transmission as the first transmission setting and the second transmission setting.

8. The information processing method according to claim 5, comprising:
setting the second data transmission to some of the information collection object apparatuses, and
repeating a selection of one second data transmission at a time from a plurality of second data transmissions and an extension of the transmission cycle of the selected second data transmission until the transmission time falls within the transmission cycle.

9. The information processing method according to claim 8, comprising:
when a same extension is added to all of the second data transmissions, once again selecting one second data transmission at a time from the plurality of second data transmissions and once again extending the transmission cycle of the selected second data transmission.

10. The non-transitory computer readable medium according to claim 6, wherein the one or more instructions cause the computer to execute:
designating a range of acquired information and setting a transmission cycle of each of the first data transmission and the second data transmission as the first transmission setting and the second transmission setting.

11. The non-transitory computer readable medium according to claim 6, wherein the one or more instructions cause the computer to execute:
setting the second data transmission to some of the information collection object apparatuses, and
repeating a selection of one second data transmission at a time from a plurality of second data transmissions and an extension of the transmission cycle of the selected second data transmission until the transmission time falls within the transmission cycle.

12. The non-transitory computer readable medium according to claim 11, wherein the one or more instructions cause the computer to execute:
when a same extension is added to all of the second data transmissions, once again selecting one second data transmission at a time from the plurality of second data transmissions and once again extending the transmission cycle of the selected second data transmission.

* * * * *